United States Patent
Yamazaki et al.

(10) Patent No.: US 7,574,475 B2
(45) Date of Patent: Aug. 11, 2009

(54) WORK FLOW SYSTEM AND CLIENT IN WORK FLOW SYSTEM

(75) Inventors: Hirohiko Yamazaki, Hachioji (JP); Masaaki Komuro, Hachioji (JP); Yuichi Kawamura, Hachioji (JP); Takamichi Sekido, Hachioji (JP)

(73) Assignee: Konica Corporation (JP)

( * ) Notice: Subject to any disclaimer, the term of this patent is extended or adjusted under 35 U.S.C. 154(b) by 1189 days.

(21) Appl. No.: 10/015,072

(22) Filed: Dec. 11, 2001

(65) Prior Publication Data
US 2002/0073161 A1 Jun. 13, 2002

(30) Foreign Application Priority Data
Dec. 13, 2000 (JP) .............................. 2000-378387

(51) Int. Cl.
*G06F 15/16* (2006.01)
(52) U.S. Cl. ..................................................... 709/206
(58) Field of Classification Search ................ 715/733; 709/206; 705/52
See application file for complete search history.

(56) References Cited

U.S. PATENT DOCUMENTS

| | | | | |
|---|---|---|---|---|
| 5,040,142 A | * | 8/1991 | Mori et al. .................. | 715/511 |
| 5,125,075 A | * | 6/1992 | Goodale et al. ............. | 709/206 |
| 5,701,484 A | * | 12/1997 | Artsy ......................... | 719/316 |
| 5,767,847 A | * | 6/1998 | Mori et al. .................. | 715/733 |
| 5,848,248 A | * | 12/1998 | Kawasaki et al. ........... | 709/238 |
| 5,940,829 A | * | 8/1999 | Tsuiki et al. ................. | 707/10 |
| 6,047,315 A | * | 4/2000 | Tsuji et al. .................. | 709/206 |
| 6,101,509 A | * | 8/2000 | Hanson et al. .............. | 715/513 |
| 6,516,328 B1 | * | 2/2003 | Mori et al. .................. | 715/500 |
| 6,526,425 B2 | * | 2/2003 | Mori et al. .................. | 715/530 |
| 6,681,233 B1 | * | 1/2004 | Ichikawa et al. ............ | 707/203 |
| 7,058,696 B1 | * | 6/2006 | Phillips et al. .............. | 709/217 |
| 2002/0161746 A1 | * | 10/2002 | Murakami et al. ............ | 707/1 |
| 2007/0282961 A1 | * | 12/2007 | Miyazawa ................... | 709/206 |

OTHER PUBLICATIONS

Notice of Rejection; Mailing Date: Aug. 21, 2007; Patent Application No. 2000-378387.
Minoru Harada, et al.; Document Workflow System Java Wave based on Active Message; Faculty of Science and Technology, Aoyama Gakuin University; Undergraduate School of Science and Technology, Aoyama Gakuin University; pp. 103-108.

* cited by examiner

*Primary Examiner*—Andrew Caldwell
*Assistant Examiner*—Benjamin Ailes
(74) *Attorney, Agent, or Firm*—Cantor Colburn LLP (57) ABSTRACT

A work flow system for circulating a digital document file to plural clients through a network, including: a transmission client for initially issuing a document file for circulation, circulation clients for sequentially circulating the document file, transmitted by the transmission client. The transmission client includes: a setup processor for setting destination information to specify destination and order of circulation; and a transmission processor for sending a circulation information file, including the destination information, and the document file to the next circulation client, which is preset so in the destination information. Each of the circulation clients includes: a transmission processor for sending the circulation information file and the document file to the next circulation client, which is preset so in the destination information, in response to a verification of the document file.

20 Claims, 5 Drawing Sheets

WORK FLOW SYSTEM AND CLIENT IN WORK FLOW SYSTEM

BACKGROUND OF THE INVENTION

The present invention relates to a work flow system which converts documents such as a Ringi-sho (request for decision) and report into digital form, and circulates them on the network, and relates also to the client of above-mentioned work flow system.

In recent years, proposal has been made for introduction of a work flow system where circulating services of a Ringi-sho (request for decision), report and the like are provided digitally on the network in corporate organizations. When a destination and the order of circulation are present in this kind of a work flow system, automatic circulating of the document in that order is executed; not only that, an effective approval of the Ringi-sho (request for decision) and the like is ensured when each circulation sender sets the approval/non-approval for the document to be circulated.

However, the prior art work flow system has assumed circulating of a document on the closed network of a client server system, and this service has been provided in the form of a server program. Namely, a shared directory is installed within a specific file server, and each client relevant to circulating accesses a file server. In such a form, the control of the circulation sender must always be monitored and recorded by a circulating management server. Further, such a prior art system has required a circulating management arrangement which provides independently management of the right of access to a document per se to be circulated and a shared directory. Moreover, the progress of circulating must be also monitored by the circulating management server. The prior art is accompanied by the following problems under these circumstances:

1) A purpose-built server for circulating management and a file server for setting a shared directory are essential.

2) Each client accesses the aforementioned server to circulate information with reference to the aforementioned file server, and all management work must be made by the server until termination of circulating, with the result that the server load is much increased.

3) Access to the server from the external network (different LAN, the Internet, etc.) is normally restricted by the Firewall and the like. This makes it difficult carry out circulation to the client connected to the external network.

4) If a document is circulated to the client of the external network, confidentiality may be violated.

SUMMARY OF THE INVENTION

The first object of the present invention is to solve the above-mentioned problems, and to provide a work flow system capable of;

(1) reducing the server load by circulating of a document file without using the purpose-built circulating management server, (2) constructing a circulating network for clients connected to different LANs and the Internet independently of the restriction of the Firewall, and (3) ensuring each circulating of a document file.

Further, another object of the present invention is to provide is to a work flow system capable of;

(1) circulating of a document file between clients by sending a circulating information file together with the document file, (2) performing circulating management by means of a purpose-built server by including various types of information in a circulating information file, and (3) having more powerful functions.

A further object of the present invention is to provide a work flow system which allows the state of circulating to be recognized by each client by sending to other clients a report that a document file has been sent to the next client, even if this document file is circulated among clients without passing through a circulating management server.

Still another object of the present invention is to provide a work flow system which allows the state of circulating to be recognized by each client by sending a report to other clients that a document file has been sent to the next client, even if this document file is circulated among clients without passing through a circulating management server.

A still further object of the present invention is to provide a work flow system which allows the status of circulation to be identified and, at the same time, allows the state of circulation to be sent back in response to an inquiry from the client, even in the server which does not perform circulating management by sending to other clients a report that a document file has been sent to the next client.

A still further object of the present invention is to provide a work flow system which allows a document file to be circulated to a client connected to the external network without any fear of confidentiality being violated, by encryption of a document file to be sent.

A still further object of the present invention is to provide a work flow system which allows a document file to be circulated among clients without going through a circulation management server, by sending a circulation information file together with a document file and which, further, provides circulation management on a server or provides more powerful functions by constituting a transmission button display means, storage button display means, verification result input means, expedition message display means, transmission completion reporting means or transmitted document encryption means for clients.

To solve the aforementioned problems, the present invention provides the following structure:

(1) A work flow system for circulating a digital document file to multiple clients through the network comprises;

a transmission client for issuing the first circulation document file further comprising:

a) a setup processing means for setting destination information to specify destination and order of circulation, and     b) a transmission processing means for sending a circulation information file including the aforementioned destination information and the aforementioned document file to the next circulation client set on the aforementioned destination information; and multiple clients for sequential circulation of the document file transmitted by the aforementioned transmitting client, further comprising:

a) a transmission processing means for sending the aforementioned circulation information file and the aforementioned document file to the next circulation client set on the aforementioned destination information, in conformity to the verification of a document file.

(2) In a work flow system for circulating a digital document file to multiple clients through the network, each client comprises;

a) a setup processing means for setting destination information to specify destination and order of circulation, and b) a transmission processing means for sending a circulation information file including the aforementioned destination information and the aforementioned document file to the next circulation client set on the aforementioned destination information;

wherein the aforementioned circulation information file includes the information on destination of transmission completion report, and, at the same time, the aforementioned document file and circulation information file the circulation client having sent to the next circulation client sends a transmission completion report, apart from the aforementioned document file, to the aforementioned report destination based on the aforementioned report destination information.

(3) A client in a work flow system for circulating a digital document file through the network comprises:

a) a setup processing means for setting destination information to specify destination and order of circulation, and b) a transmission processing means for sending a circulation information file including the aforementioned destination information and the aforementioned document file to the next circulation client set on the aforementioned destination information;

wherein the aforementioned circulation information file includes the information on destination of transmission completion report. Further, the aforementioned document file and circulation information file the circulation client having sent to the next circulation client sends a transmission completion report, apart from the aforementioned document file, to the aforementioned report destination based on the aforementioned report destination information.

(4) A software product for circulating a digital document file through the network comprises;

a) a setup processing means for setting destination information to specify destination and order of circulation as circulation information file, b) a first transmission processing means for sending the aforementioned circulation information file to the next circulation client set on the aforementioned destination information, and c) a second transmission processing means for sending a transmission completion report to a specific server based on the aforementioned report destination information, wherein the aforementioned circulation information file includes the report destination information on the report destination of the transmission completion report.

(5) In a work flow system for circulating a digital document file on the network accessed by multiple clients, the circulation information file related to circulation of the aforementioned document file together with the aforementioned document file is sent and circulated on the network.

(6) In a work flow system for circulating a digital document file on the network accessed by multiple clients, the client having received the aforementioned document file sends a verified document file to the next client in conformity to the verification of a document file, and sends a transmission completion report to that effect to other clients.

(7) In a work flow system for circulating a digital document file on the network accessed by multiple clients, the last client where the aforementioned document file is circulated sends a circulation completion report to other clients to notify termination of circulation, in conformity to the verification of a document file.

BRIEF DESCRIPTION OF THE DRAWINGS

FIG. 2 (A) is a block diagram representing the circulation file configuration, and FIG. 2 (B) is a block diagram representing the report file configuration;

DETAILED DESCRIPTION OF THE PREFERRED EMBODIMENT

Figure 1:
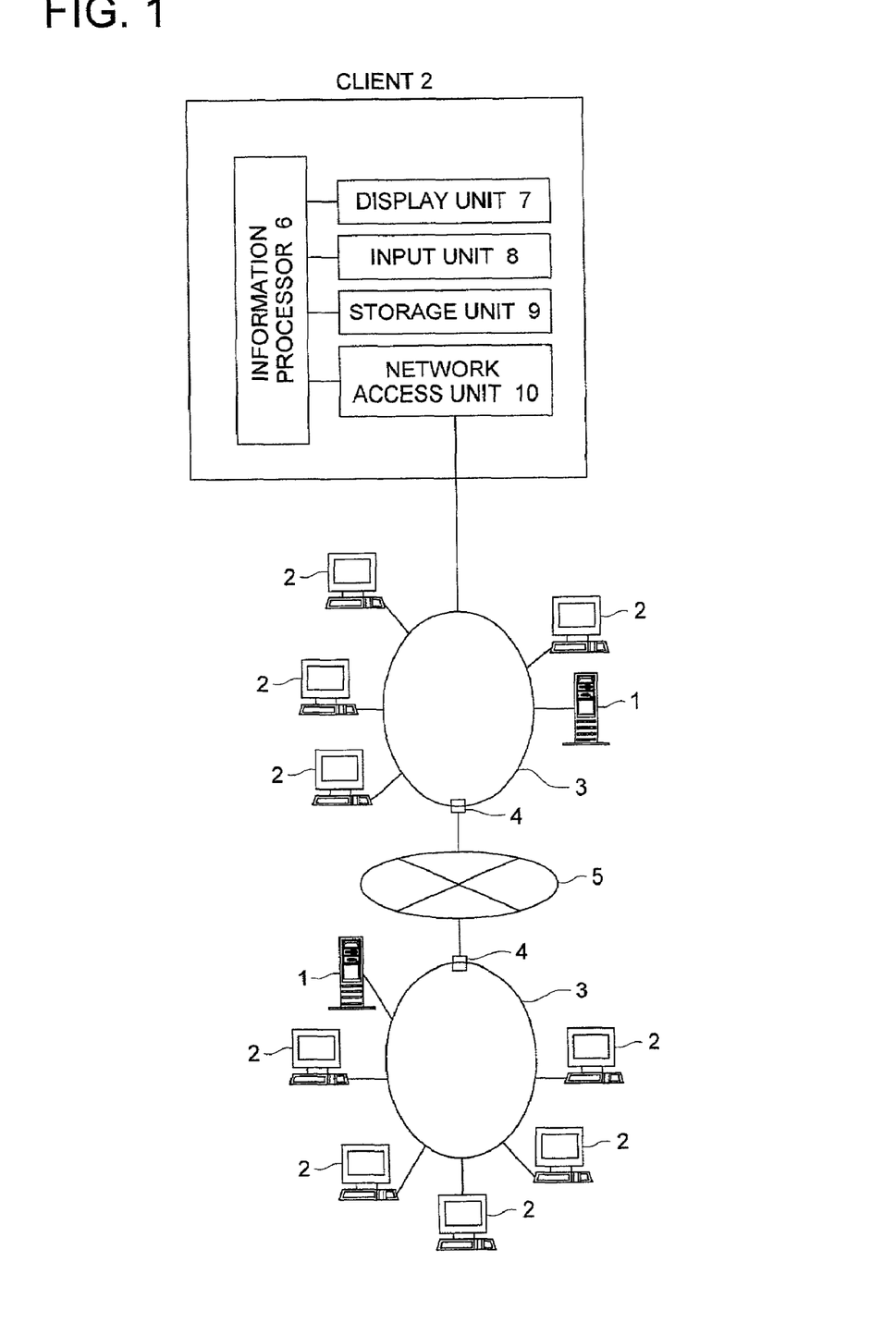
FIG. 1 is a block diagram representing the configuration of work flow system hardware.

The following describes the details of the embodiments according to the present invention with reference to drawings:

FIG. 1 is a block diagram representing the configuration of work flow system hardware as an embodiment according to the present invention.

As shown in FIG. 1, hardware of the work flow system as an embodiment of the present invention comprises a network 3 such as LAN connected with server 1 and multiple clients 2, and an Internet 5 connected with multiple networks 3 via a gateway 4. The aforementioned server 1 and client 2 comprise;

an information processor 6 for processing digital information, a display unit 7 for displaying digital information, an input unit 8 for inputting digital information, storage unit 9 for storing the file which can be read by the aforementioned information processor 6, and a network access unit 10 for connecting the aforementioned information processor 6 with the network 3.

Figure 2A:
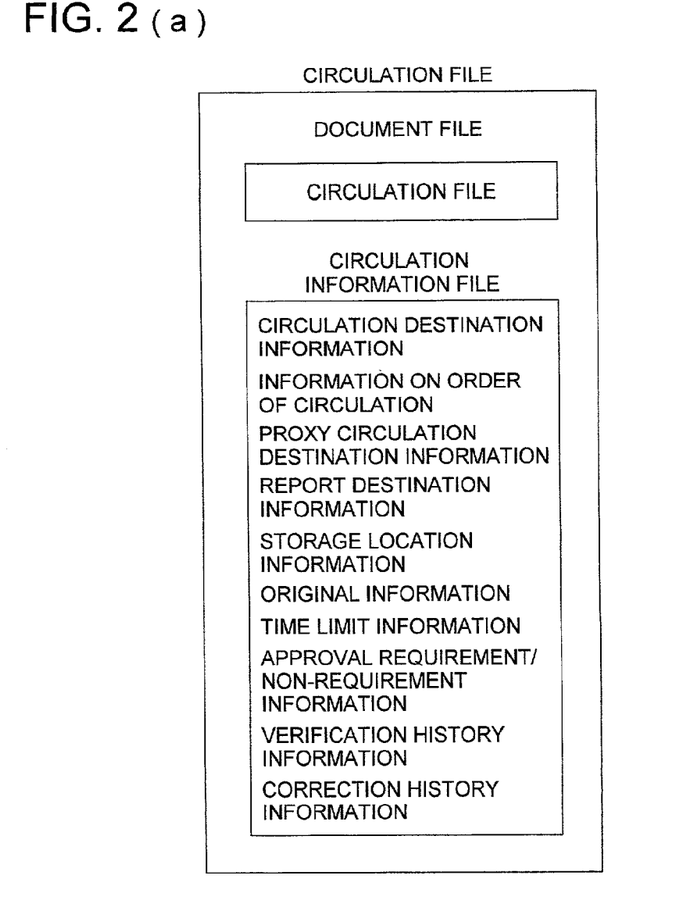

FIG. 2 (A) is a block diagram representing the circulation file configuration of a work flow system. This circulation file consists of;

a document file including a circulation document such as a digital Ringi-sho (request for decision) and a report, and a circulation information file containing various types of information related to circulation.

The aforementioned circulation information file comprises;

(1) destination information for specifying a destination, (2) information on the order of circulation for specifying the order of circulation, (3) proxy circulation destination information for specifying a proxy for each destination, (4) report destination information for specifying a destination when reporting transmission completion and disabled circulation, (5) storage destination information for specifying a destination for storage of a circulation completion document file, (6) original information for specifying the source from which the original document file is stored, (7) time limit information for specifying the time limit for circulation, (8) approval requirement/non-requirement information for specifying whether or not it is necessary to request each client 2 for approval operation, (9) verification history information for recording verification results (approval result) of the document file in each client 2, and (10) correction history information for recording corrections of a document file in each client 2.

Figure 2B:
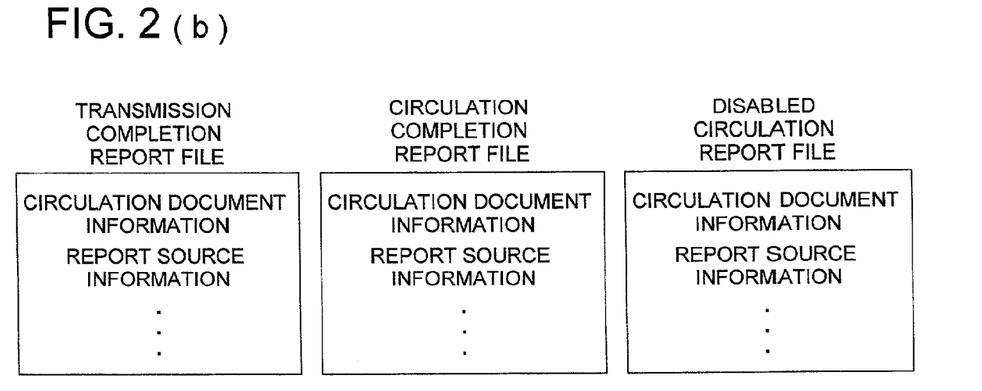

FIG. 2 (B) is a block diagram representing the report file configuration in a work flow system. This report file comprises;

(1) a transmission completion report file for reporting to another client 2 (or server 1) that a circulation file has been sent to the next circulation client 2, (2) a circulation completion report file for reporting to another client Z (or server 1) that the last client 2 has stored the document file at a specified storage site, and (3) a disabled circulation report file for reporting to another client Z (or server 1) that circulation to the next circulation client 2 is disabled. Each report file contains at least a circulation document information for specifying a circulation document and a report source information for specifying a source of report.

Figure 3:
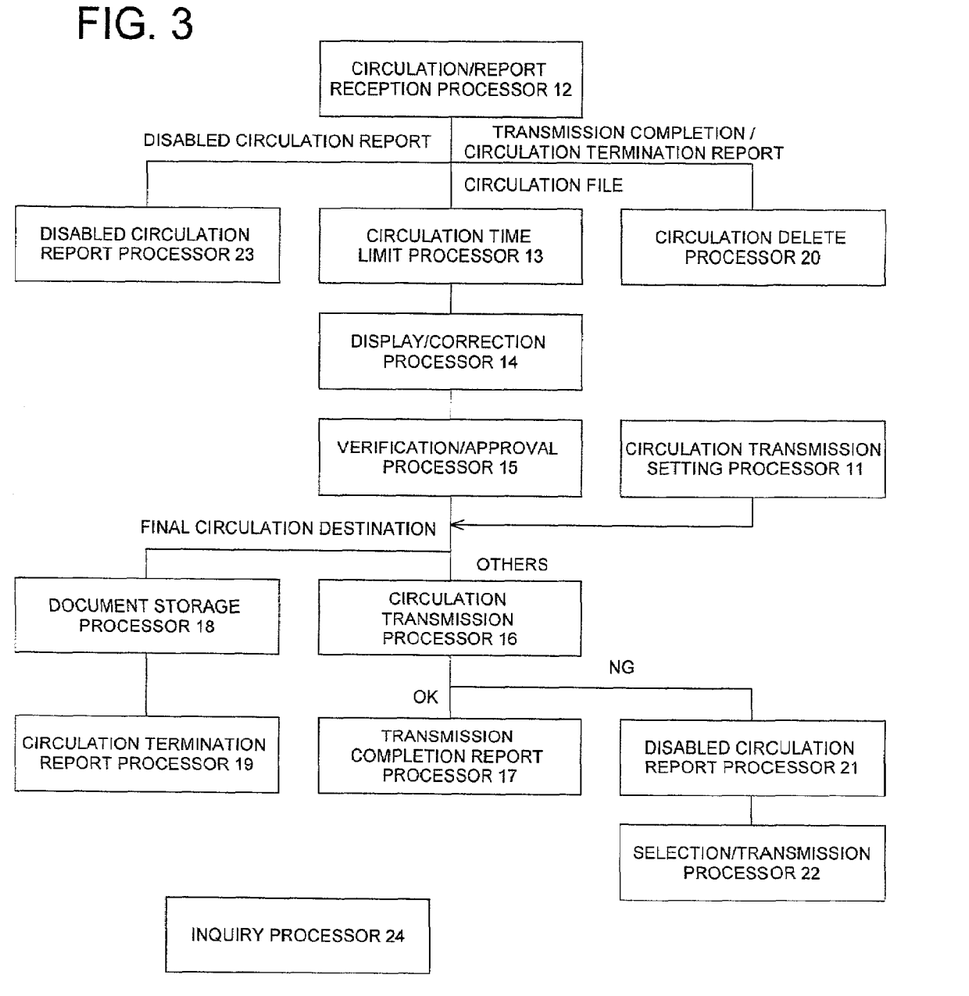
FIG. 3 is a block diagram representing the client software configuration.

FIG. 3 is a block diagram representing the software configuration in the aforementioned client 2. The aforementioned software comprises a circulation transmission setting processor 11, circulation/report reception processor 12, circulation time limit processor 13, display/correction processor 14, verification/approval processor 15, circulation transmission processor 16, transmission completion report processor 17, document storage processor 18, circulation completion report processor 19, circulation delete processor 20, disabled circulation report processor 21, selection/transmission processor 22, disabled circulation report processor 23, inquiry processor 24, etc. The following describes the processing of each processors 11 and 24 one after another.

The circulation transmission setting processor 11 is operated in a transmitting client 2 which first sends a circulation file. On the setting screen displayed on a display unit 7 by the aforementioned circulation transmission setting processor 11, it is possible to freely set the aforementioned destination information, information on the order of circulation, report destination information, storage location information, original information, time limit information and approval requirement/non-requirement information, in addition to designation of a circulation document. Upon termination of this setting work, the file to be circulated (document file and circulation information file) is generated in conformity to the aforementioned settings. The generated circulation file is sent to the first circulation client 2 specified based on the aforementioned destination information and order of circulation information by the circulation transmission processor 16 to be described later. The circulation file is directly sent and received among clients. For example, a transmission destination address (IP address, etc.) can be specified based on circulation destination information, and can be sent on a peer-to-peer basis.

The circulation/report reception processor 12 is configured to receive a circulation file or report file, and, at the same time, to store the receiving file in the aforementioned storage unit 9. Further, when the receiving file is encrypted, the encrypted file is decoded based on a preset decoding key, and is then stored in the storage unit 9.

The circulation time limit processor 13 is configured to refer to the time limit information included in the circulation information file of the received circulation file and. If the aforementioned time limit information has expired, the message of prompting verification and approval of the document file included in the circulation file is displayed on the aforementioned display unit 7.

The display/correction processor 14 ensures that the document file included in the received circulation file is displayed on the aforementioned display unit 7. Further, if the displayed document file has been corrected by the circulation sender, the contents of correction are to be added to the correction information of circulation information file.

Based on the approval requirement/non-requirement information included in the circulation information file of the received circulation file, the verification/approval processor 15 determines whether approval is required or not. If approval is not required, a verification button is displayed in a part of the document file display screen. If approval is required, both approval button and non-approval button are displayed. Further, if any one of the buttons is operated, the result of the operation is added to verification history information of the circulation information file.

Based on the circulation destination information and order of circulation information included in the circulation information file of the circulation file, the circulation transmission processor 16 specifies the next circulation client 2 and, at the same time, displays a transmission button on the display unit 7. It sends the circulation file to the next circulation client 2 in conformity to the operation of the aforementioned transmission button. Further, when the next circulation client 2 is a client 2 outside the same network, it is transmitted subsequent to encryption of the circulation file (document file) based on the preset encryption key.

When transmission of the circulation file by the aforementioned circulation transmission processor 16 has correctly terminated, the transmission completion report processor 17 specifies the client 2 (or server 1) to which report is to be sent, based on the report destination information included in the circulation information file of the circulation file. Then it sends a transmission completion report file to the aforementioned report destination notifying that the circulation file has been sent to the next circulation client 2. This report file can be send to the mail server inside the network. In this case, the report file is sent as an electronic mail or a file attached thereto to the electronic mail address of the client of the partner. The electronic mail stored in the mail box inside the server is referred to by the client of the partner whenever necessary, whereby the partner client recognizes that the circulation information file is addressed to itself.

The document storage processor 18 performs its function when the circulation client 2 having received the circulation file is the last destination. In the aforementioned document storage processor 18, the client 2 (or server 1) for storing the circulation file is specified based on the storage location information included in the circulation information file of the circulation file. Further, the circulation file is stored (sent) to the aforementioned storage location. If when the storage source of the original document file is set in the original information included in the circulation information file of the circulation file, the original document file is obtained from the aforementioned storage source. At the same time, the aforementioned original document file is stored in the aforementioned storage location.

When storage (transmission) of the circulation file by the aforementioned document storage processor 18 has correctly terminated, the circulation completion report processor 19 specifies the client 2 (or server 1) to which report is sent, based on the report destination information includes in the circulation information file of the circulation file. At the same time, the circulation completion report file is sent to this report destination notifying that the circulation file has been stored in the storage location. This circulation completion report file can be sent by electronic mail, similarly to the aforementioned transmission completion report file.

The circulation delete processor 20 is operated by the client 2 having received the aforementioned transmission completion report file or circulation completion report file. Of the circulation files stored in storage unit 9, those corresponding to the aforementioned report file is deleted or can be deleted in the aforementioned circulation delete processor 20.

When transmission of the circulation file by the aforementioned circulation transmission processor 16 has failed to terminate correctly, the disabled circulation report processor 21 specifies the client 2 (or server 1) to which report is sent, based on the report destination information included in the circulation information file of the circulation file. At the same time, a disabled circulation report file is sent to the aforementioned report destination notifying that the circulation file cannot be sent to the next circulation client 2. As described above, the aforementioned report file can be sent as an electronic mail or a file attached thereto.

When transmission of the circulation file by the aforementioned circulation transmission processor 16 has failed to terminate correctly, the selection/transmission processor 22 specifies the proxy client 2 of the next circulation client 2, based on the proxy destination information included in the circulation information file of the circulation file. Further, the circulation clients 2 are specified one after another based on the destination information and information on the order of circulation. Further, the aforementioned two specified clients 2 are displayed on the display unit 7, and selection of one of them is prompted. Then the circulation file is sent to the selected client 2.

The disabled circulation report processor 23 is operated by the client 2 having received the aforementioned disabled circulation report file. Based on information included in the disabled circulation report file, the client 2 of disabled circulation is specified in the aforementioned disabled circulation report processor 23. Then a message is indicated on the display unit 7 to notify that circulation is disabled on the aforementioned client 2.

The inquiry processor 24 is enabled when the server 1 is set to the report destination of the report file. The inquiry file is sent to the server 1 in the aforementioned inquiry processor 24 in conformity to the specified operation. Further, a reply file returned from the server 1 is received to indicate this reply file on the display unit 7.

Figure 4:
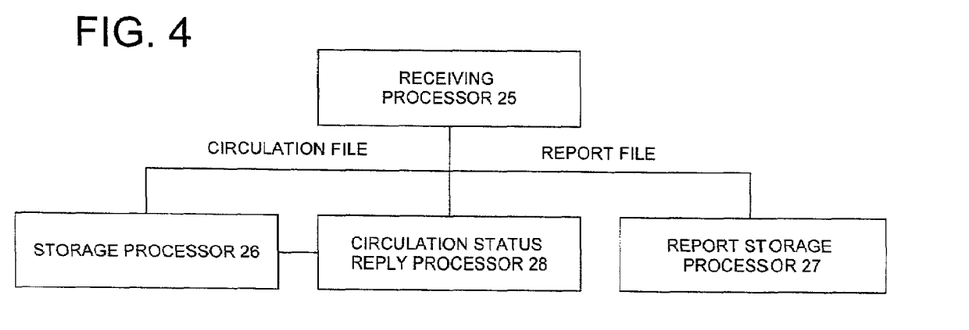
FIG. 4 is a block diagram representing the server software configuration.

FIG. 4 is a block diagram representing the software configuration in the aforementioned server 1. This software comprises a receiving processor 25, storage processor 26, report storage processor 27 and circulation status reply processor 28. The following describes the operations of processors 25 and 28:

The receiving processor 25 is arranged to receive a storage circulation file, report file or inquiry file. When a receiving file is encrypted, the encrypted file is decoded based on a preset decoding key. Here the circulation file for storage corresponds to the aforementioned document file and circulation information file including the circulation document.

Further, when a file (circulation file for storage, report file or inquiry file) has been sent by electronic mail as described above, the aforementioned receiving processor 25 is capable of performing the following processing according to each report file inside the mail box of the server:

The storage processor 26 is operated when the circulation file for storage has been received. In the aforementioned storage processor 26, a received file for storage is stored in the predetermined area of the storage unit 9.

The report storage processor 27 is operated upon receipt of a report file (including the file for transmission completion report, circulation completion report or disabled circulation report). The received report file is stored in the predetermined area of the storage unit 9 in the aforementioned report storage processor 27.

The circulation status reply processor 28 is operated upon receipt of an inquiry file. In the aforementioned circulation status reply processor 28, reference is made to the report file of the circulation document related to inquiry. Further, based on the aforementioned report file, it specifies up to what client 2 the circulation document has been circulated or which client 2 has verified the circulation document at present. The specified circulation status information is sent as a reply to the client 2 which has made inquiry.

It should be noted that the data in the mail header can be used to detect such an electronic mail. Further, in the aforementioned software on the client side it is also possible to assign a specific data in the mail header when an electronic mail is sent.

Figure 5:
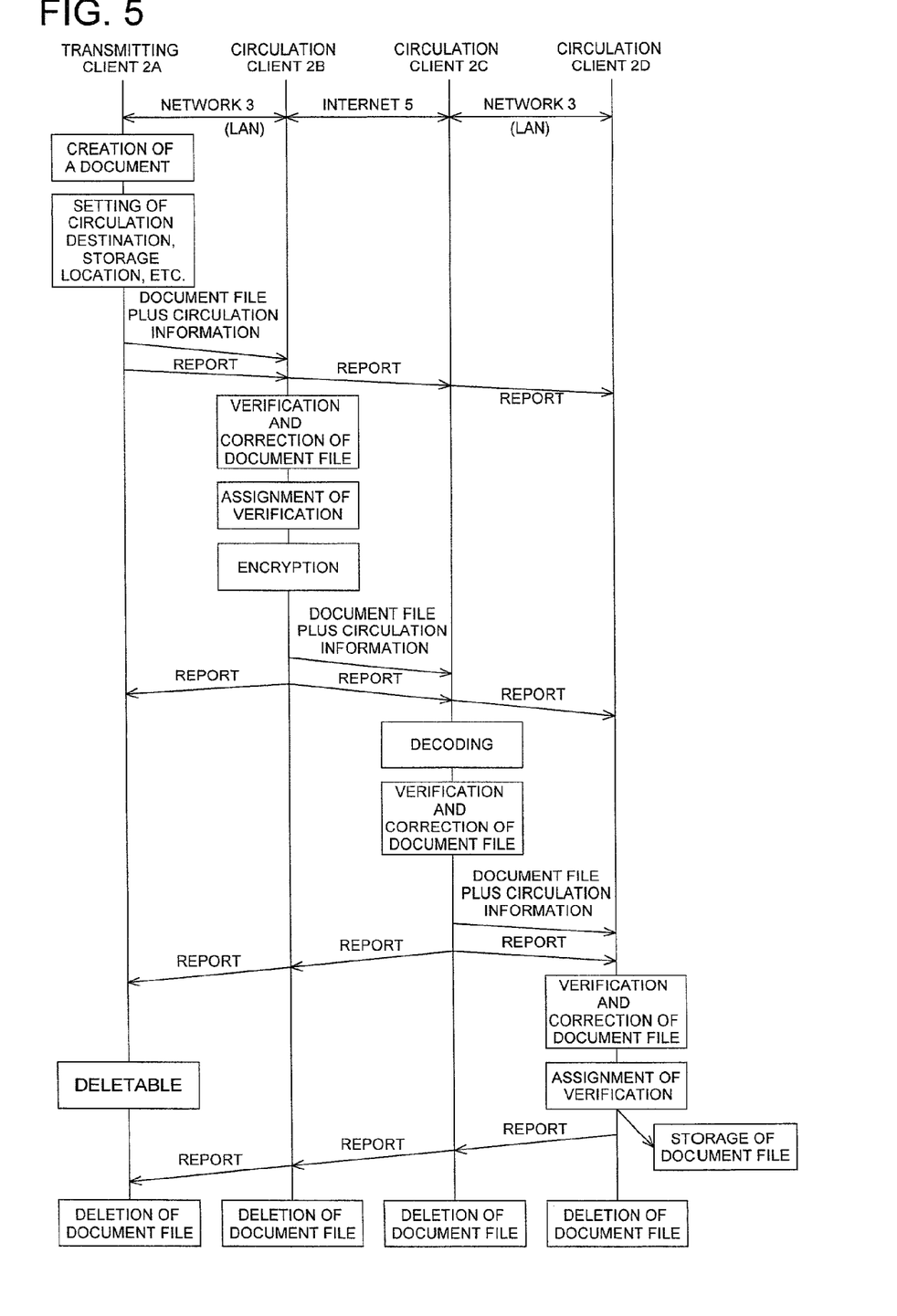
FIG. 5 is a ladder diagram representing the operation of a client in a work flow system.

FIG. 5 is a ladder diagram representing the operation of client 2 in a work flow system. This ladder diagram shows the case where circulation is carried out among (1) a transmitting client 2A, (2) a circulation client 2B linked to the aforementioned transmitting client 2A via the network 3 (LAN), (3) a circulation client 2C linked to the aforementioned circulation client 2B via the Internet 5, and (4) a circulation client 2D linked to the aforementioned circulation client 2C via the network 3 (LAN). The following describes the operations for clients 2A to 2D one by one.

In the transmitting client 2A, the document to be circulated is created or specified, and, at the same time, the following information is set: circulation information such as circulation destination information, information on the order of circulation, proxy destination information, report destination information, storage location information, original information, time limit information and approval requirement/non-requirement information. After that, when the transmission button displayed on the screen is pressed, the circulation file including the document file and circulation information file is sent to the circulation client 2B. Further, when this transmission has terminated correctly, the transmission completion report file is set to the clients 2B, 2C and 2D. Here the circulation file is directly sent to the circulation client 2B. As will be described later, the transmission completion report file is assigned with the electronic mail addresses of circulation clients 2B, 2C and 2D, and is sent to the server in the form of an electronic mail.

Upon reception of the circulation file in the circulation client 2B, this file is stored in the storage unit 9. At the same time, the document file is displayed on the display unit 7 to prompt verification or approval operation. The result of this operation is added to the verification history information of a circulation information file. When the transmission button given on the screen is pressed after that, the circulation file is sent to the circulation client 2C. The aforementioned circulation client 2C is connected to an external network, so the circulation file is sent to the circulation client 2C after having been encrypted. Further, when this transmission has correctly terminated, the transmission completion report file is sent to client 2A, 2C and 2D.

The encrypted circulation file can be sent, for example, to the circulation client 2C through the FTP server of the external network. In this case, it can be sent to the FTP server using a password.

Upon receipt of a circulation file, it is decoded in the circulation client 2C, and is then stored in the storage unit 9. At the same time, the document file is indicated on the display unit 7 to prompt the operation of verification or approval. The result of this operation is added to the verification history information of the circulation information file. When the transmission button shown on the screen is pressed after that, the circulation file is sent to the circulation client 2D. Further, when this transmission has correctly terminated, the transmission completion report file is sent to client 2A, 2B and 2D.

Here a circulation file can be sent just as it can be sent from the aforementioned circulation client 2A to the 2B. The transmission completion report file is assigned with electronic mail addresses of the circulation clients 2A, 2B and 2D, and is sent in the form of an electronic mail. Because of the form of an electronic mail, the report can be to the corresponding circulation client without fail independently of whether the network is an external network or not.

Upon receipt of a circulation file, it is stored in the storage unit 9 in the circulation client 2D. At the same time, the document file is indicated on the display unit 7 to prompt verification or approval operation. The result of this operation is added to the verification history information of a circulation information file. In the circulation client 2D as a final sender, a storage button is displayed subsequent to the operation of verification, and the circulation file is sent to the predetermined storage location in conformity to the operation of the aforementioned storage button. Further, when this transmission has correctly terminated, the circulation completion report file is sent to clients 2A, 2B and C by electronic mail and the like. In clients 2A, 2B and C having received it, the circulation file stored in the storage unit 9 is automatically deleted. Further, as the circulation completion report file is transmitted, the circulation file stored in the storage unit 9 is automatically deleted.

Figure 6:
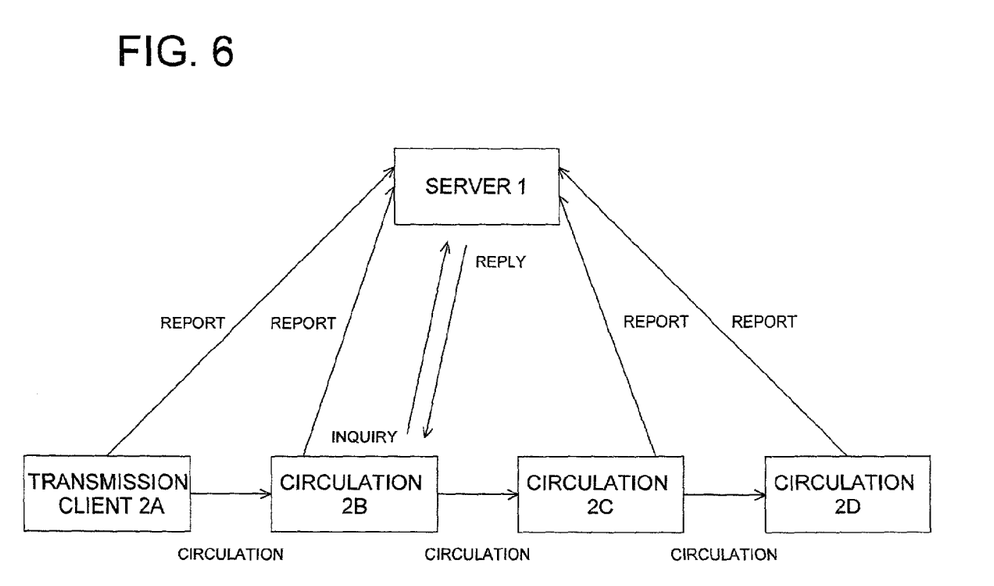
FIG. 6 is a ladder diagram representing the operation of a server in a work flow system.

FIG. 6 is a ladder diagram representing the operation of a server 1 in a work flow system. Similarly to the ladder diagram of FIG. 5, this block diagram shows the operation when server 1 is designated as a report destination of the transmission completion report file and the like in circulation among the clients 2A to 2D. Server 1 can use a mail server, for example. In this case, each file can be sent in the form of an electronic mail or file attached thereto.

Namely, upon receipt of a report file (including the file for transmission completion report, circulation completion report or disabled circulation report), the server 1 stores the received report file in the predetermined area of the storage unit 9. Further, when clients 2A to 2D send an enquiry file to the server 1, reference is made to the report file of the circulation document related to the inquiry. At the same time, based on the report file, it specifies up to what client 2 the circulation document has been circulated or which client 2 has verified the circulation document at present. The specified circulation status information is sent as a reply to the client 2 which has made inquiry.

In the embodiment of the present invention arranged in the above configuration, a circulation sender and the order of circulation are set in advance in the work flow system, and the document is automatically circulated in that order. The Ringisho (request for decision) and the like are approved by each circulation sender setting the approval/non-approval for the document to be circulated. The work flow system according to the present invention includes a transmission client 2 for issuing the first circulation document file and multiple clients 2 for sequential circulation of the document file transmitted by the aforementioned transmitting client 2. The aforementioned transmitting client 2 sets the circulation destination information for specifying the circulation destination and the order of circulation. At the same time, the circulation information file including the circulation destination information and document file are sent to the next client 2 preset in the aforementioned circulation destination information, and are stored in the storage unit 9 of the circulation client 2. Upon receipt of the aforementioned circulation information file and document file, the circulation client 2 sends the aforementioned circulation information file and document file to the next circulation client 2 preset in the circulation destination information in conformity to the verification of the document file, and stores them in the storage unit 9 of the circulation client 2. The circulation file is directly exchanged among circulation clients. Transmission on a peer-to-peer basis is one of the methods available.

Accordingly, a circulation information file for specifying the circulation destination is also sent with the document file. Sequential circulation of document files among clients is enabled without passing through the conventional server for circulation management, and there is no need of circulation management by a server, with the result that server loads have been reduced. Moreover, for the client 2 connected to different LANs and Internet 5, it has become possible to configure the circulation network immune to the restriction by the Firewall, and circulation of the document file has been facilitates.

Having sent the aforementioned document file and circulation information file to the next circulation client 2 (including the storage location), the circulation client 2 sends the transmission completion report file (including the circulation completion report file) indicating that it has sent it to the next circulation client 2 to another circulation client 2 or transmitting client 2. This can be realized by transmission of an electronic mail to the specified server, for example, a mail server.

Accordingly, while the document file is circulated among clients 2 without passing through the server for circulation management, the status of circulation can be identified by each client 2. Moreover, the transmitting client 2 can freely set the aforementioned report destination (for example, transmitting client 2 or the previous circulation client 2). This makes it possible to avoid the disadvantage of increasing the processing load of the client 2 by indiscriminate transmission of transmission completion report files to all clients 2.

Further, the aforementioned report destination is a server 1 supervising circulation of the documents file, and the circulation client 2 having sent the aforementioned document file and circulation information file to the next circulation client 2 sends the transmission completion report file (including the circulation completion report file and disabled circulation report file) to the server. This arrangement permits the status of circulation to be identified even in the server 1 which does not manage circulation. Not only that, the circulation status information can be returned in response to an inquiry from the client based on the aforementioned transmission completion report file. Further, unloading or downloading of the circulation file proper to the server 1 is not required, and this signifies a substantial improvement of the traffic in a specific server.

Further, upon receipt of the aforementioned transmission completion report file (including the circulation completion report file), the circulation client 2 or transmitting client 2 deletes or makes it possible to delete the aforementioned document file and circulation information file stored in the aforementioned storage unit 9. This avoids the disadvantage that the document file and circulation information file unnecessary to the storage unit 9 of the client 2 are accumulated.

Further, the last circulation client 2 stores the aforementioned document file in the predetermined storage location. While document files are circulated among clients 2 without passing through the server for circulation management, verification of the circulation completion document is facilitated. Further, when the circulation completion document file is stored, the original document file can be obtained and stored, with the result that the reliability of the storage document is improved.

Further, the aforementioned circulation client 2 adds the history information including the result of verifying the document file to the aforementioned circulation information file, and sends it to the next circulation client 2. While document files are circulated among clients 2 without passing through the server for circulation management, Ringi-sho (request for decision) or other documents accompanying approval can be circulated. Moreover, whether a document file requires approval operation or not can be set freely.

This avoids the disadvantage of increasing the load of the circulation sender by requesting the operation of approval even for the document file which does not require approval.

Further, when the time limit of time limit information including the aforementioned circulation information file has expired, the aforementioned circulation client 2 prompts the verification of the aforementioned document file, thereby preventing a substance delay of circulation. Moreover, the transmitting client 2 can set the aforementioned circulation time limit freely, and this meets the requirements for urgent circulation.

Further, the aforementioned circulation client 2 or transmission client 2 permits encryption of the document file to be transmitted, whereby a document file can be sent to the client 2 linked to the external network without confidentiality being violated.

When circulation to the next circulation client 2 is disabled, the aforementioned circulation client 2 or transmitting client 2 sends the report file to another circulation client 2 or transmitting client 2 notifying that circulation is disabled. While document files are circulated among client 2 without passing through the circulation management server, each client 2 is allowed to identify the client 2 where circulation is disabled.

When circulation is disabled in the next circulation client 2, a file can be circulated by skipping the aforementioned next circulation client 2 or can be circulated to a proxy client 2 of the next circulation client 2. This eliminates the possibility of delayed circulation. Moreover, since free selection between them is permitted, quick circulation is ensured based on the selection in conformity to a particular situation.

Further, the aforementioned circulation client 2 adds a correction of the aforementioned document file to the aforementioned circulation information file as correction information, and transmits it to the next circulation client 2. While document files are circulated among clients 2 without passing through circulation management server, the details of the correction can be identified by each client 2.

Moreover, the aforementioned client 2 allows the transmission button or storage button to be displayed on the display unit 7, and permits transmission to the next circulation client 2 or storage location according to the aforementioned button operation. This makes it possible to perform an intuitive operation and prevents incorrect transmission, thereby improving the reliability of the work flow system.

EFFECTS OF THE INVENTION

The aforementioned arrangement according to the present invention eliminates the need of circulation management by the server and reduces the server load by circulation of a document file among clients without passing through circulation management server. Moreover, a circulation network immune to the restriction by the Firewall can be configured for the clients connected to the different LANs and the Internet, and circulation of a document file is facilitated.

In the present invention, a circulation information file is sent together with document file, thereby permitting circulation of a document file among clients without passing through circulation management server. Moreover, inclusion of a great variety of information in the circulation information file provides functions equal to or greater that those of the work flow system where circulation is managed by a server.

In the present invention, a transmission completion report is sent to another client notifying that the document file has been sent to the next client. So while a document file is circulated among clients without passing through circulation management server, the status of circulation can be identified by each client.

In the present invention, a circulation completion report is sent to another client notifying that circulation has terminated. So while a document file is circulated among clients without passing through circulation management server, the status of circulation can be identified by each client.

Further, according to the present invention, a transmission completion report to the server is sent to the server notifying that a document file has been sent to the next client, whereby the status of circulation can be identified by the server which does not provide manage circulation management. At the same time, the status of circulation can be sent back in response to the inquiry from clients.

In identification of the aforementioned status of circulation, each of the aforementioned report files is sent by electronic mail or the like. This makes it possible to configure a circulation network without being restricted to by the Firewall, for the client connected to the different LANs or the Internet, and to facilitate circulation of a document file.

According to the present invention, a document file to be sent is encrypted, thereby ensuring circulation the document file without confidentiality being violated for the client connected to an external network.

Further, according to the present invention, a circulation information file is sent together with a document file, thereby allowing circulation of a document file among clients without passing through a circulation management server. Moreover, when a transmission button display means, storage button display means, verification result input means, prompt message display means, transmission completion report means or transmission document encryption means is configured in a client, it is possible to provide functions equal to or greater that those of the work flow system where circulation is managed by a server.

What is claimed is:

1. A work flow system for circulating a digital document file to a plurality of clients through a network, comprising:
 a transmission client for initially issuing a document file for circulation, comprising:
  a) a circulation transmission setup processing unit which sets a circulation information file including destination information to specify destination, order of circulation, and proxy destination information, and b) a transmission processing unit which sends said circulation information file and said document file to the next one of a plurality of circulation clients, which is preset so in said destination information; and said plurality of circulation clients for sequentially circulating said document file, transmitted by said transmission client, each comprising:

a transmission processing unit which sends said circulation information file and said document file to the next one of said plurality of circulation clients, which is preset so in said destination information, wherein when the next one of plurality of circulation clients is incapable of circulation because the transmission of the circulation information file or the document file to the next one of the plurality of circulation clients terminates incorrectly, one of said plurality of circulation clients, having sent said document file and said circulation information file to said next one of said plurality of circulation clients being incapable of circulation, conducts at least one of (1) sending said document file and said circulation information file to other one of said plurality of circulation clients next to said next one of said plurality of circulation clients, and (2) sending said document file and said circulation information file to a proxy client of said next one of said plurality of circulation clients so that the circulation of said circulation information file and said document file is continued regardless of said circulation client being incapable of conducting circulation.

2. The work flow system of claim 1, wherein said circulation information file further includes report destination information to specify a report destination, and said one of circulation clients, having sent said document file and said circulation information file to the next one of said plurality of circulation clients, sends transmission completion report in accordance with said report destination information.

3. The work flow system of claim 2, wherein said report destination is a server for controlling a circulation of said document file; said one of circulation clients, having sent said document file and said circulation information file to the next one of said plurality of circulation clients, sends said transmission completion report to said server; and said server sends circulation state information in response to a request from one of said transmission client and said plurality of circulation clients in accordance with said transmission completion report.

4. The work flow system of claim 3, wherein said circulation state information includes information indicating that said document file for circulation is circulated to which one of said plurality of circulation clients, or information indicating that which one of said plurality of circulation clients is confirming said document file.

5. The work flow system of claim 2, wherein said transmission client or one of said plurality of circulation clients, having sent said document file and said circulation information file to the next one of said plurality of circulation clients and having received said transmission completion report, deletes or makes it possible to delete said document file and said circulation information file from a memory portion.

6. The work flow system of claim 1, wherein said circulation information file includes storage location information of a storage destination after the circulation of said document file; and one of said plurality of circulation clients, to which said document file is circulated at last, stores said document file to said storage destination in said storage location information.

7. The work flow system of claim 1, wherein said document file for circulation is created from an original document file stored in a predetermined storage; said circulation information file includes original information of a storage destination of said original document and storage location information of a storage destination after the circulation of said document file; and one of said plurality of circulation clients, to which said document file is circulated at last, obtains said original document file in response to an approval operation of said document file in accordance with said original information, and stores said original document to said storage destination of said storage location information.

8. The work flow system of claim 1, wherein said one of plurality of circulation clients, having received said document file and circulation information file, adds history information including a verification result of said document file to said circulation information file and sends said document file and circulation information file to the next one of said plurality of circulation clients.

9. The work flow system of claim 1, wherein said circulation information file includes time limit information for circulation time limit of said document file; and said one of plurality of circulation clients, having received said document file and circulation information file, requests an approval operation of said document file when said circulation time limit of said time limit information is expired.

10. The work flow system of claim 1, said transmission client or one of said plurality of circulation clients, sending said document file and said circulation information file to the next one of said plurality of circulation clients, encrypts said document file before sending said document file.

11. The work flow system of claim 1, wherein said transmission client or one of said plurality of circulation clients, having received said document file and said circulation information file, adds correction information, for making a correction on said document file, to said circulation information file and sends said document file and said circulation information file to the next one of said plurality circulation clients.

12. The work flow system of claim 1, wherein one of said plurality of circulation clients, to which said document file is circulated at last, sends circulation completion report to other ones of said plurality of circulation clients.

13. The work flow system of claim 1, wherein said transmission client or each of said plurality of circulation clients comprises:

an information processing unit which processes electronic information; and a storage unit which stores a file which is readable with said information processing unit;

wherein said storage unit stores said document file or said circulation information file when said document file or said circulation information file is received.

14. The work flow system of claim 13, wherein said transmission client or each of said plurality of circulation clients comprises a display unit which displays a transmission button and sends said document file and said circulation information file to the next one of said plurality of circulation clients, which is preset so in said circulation information file, so as to be stored in said storage unit of said next one of said plurality of circulation clients in response to an operation of said transmission button.

15. The work flow system of claim 1, wherein the circulation information file further includes report destination information to specify a report destination, and each of said plurality of circulation clients further comprises a disabled circulation report processing unit to send a disabled circulation report to the report destination when the transmission of a circulation information file terminates incorrectly.

16. The work flow system of claim 15, wherein when the next one of plurality of circulation clients is incapable of circulation because the transmission of the circulation information file or the document file to the next one of the plurality of circulation clients terminates incorrectly, one of said plurality of circulation clients, having sent said document file and said circulation information file to said next one of said plurality of circulation clients being incapable of circulation, sends the disabled circulation report to the report destination based on the report destination information included in said circulation information file.

17. A computer readable recording medium in which software is recorded, a computer executing the software carries out the steps of:
   receiving a circulation information file and a document to be circulated among a plurality of destinations in a predetermined order from one of the destinations and an originator of the circulation;
   (1) determining a next destination of the document;
   (2) determining if the next destination is capable of circulating the document to a successive destination by determining if transmission of the document to the next destination terminated correctly;
   (3) carrying out at least one of the following steps, if it is determined that the next destination is incapable of circulation:
      (3-1) sending the document to at least one of the successive destination; and
      (3-2) sending the document to a proxy of the next destination.

18. The computer readable medium as claimed in claim 17, wherein circulating information on the destinations and the predetermined order is attached to the document, and the next destination is determined in the step (1) in accordance with the attached circulating information.

19. The computer readable medium as claimed in claim 17, wherein the circulating information on the destinations and the predetermined order has been set by the originator.

20. A computer readable recording medium in which software is recorded, a computer executing the software carries out the steps of:
   (1) setting up circulation information of a document, the circulation information including an order of the circulation among a plurality of destinations;
   (2) determining if a first one of the destinations to which the computer sent the document is capable of circulating the document to a second one of the destinations by determining if transmission of the document to the first one of the destinations terminated correctly;
   (3) sending, if it is determined that the first one of the destinations is incapable of circulation, the document and the circulation information to at least one of the second one of the destinations and a proxy of the first one of the destinations.

* * * * *

UNITED STATES PATENT AND TRADEMARK OFFICE
CERTIFICATE OF CORRECTION

PATENT NO. : 7,574,475 B2
APPLICATION NO. : 10/015072
DATED : August 11, 2009
INVENTOR(S) : Yamazaki et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1603 days.

Signed and Sealed this

Fourteenth Day of December, 2010

David J. Kappos
*Director of the United States Patent and Trademark Office*